United States Patent
Prange et al.

(10) Patent No.: US 7,231,372 B1
(45) Date of Patent: Jun. 12, 2007

(54) METHOD AND SYSTEM FOR PAYING FOR GOODS OR SERVICES

(75) Inventors: Stefan Prange, Munich (DE); Andreas Lahr, Germering (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,961

(22) PCT Filed: Sep. 15, 1999

(86) PCT No.: PCT/DE99/02934

§ 371 (c)(1),
(2), (4) Date: Mar. 22, 2001

(87) PCT Pub. No.: WO00/17833

PCT Pub. Date: Mar. 30, 2000

(30) Foreign Application Priority Data

Sep. 22, 1998 (DE) .................................. 198 43 439
Feb. 22, 1999 (DE) .................................. 199 07 496

(51) Int. Cl.
*G06F 17/60* (2006.01)
(52) U.S. Cl. .................. 705/67; 705/1; 705/35; 705/36; 705/61; 705/64; 455/558
(58) Field of Classification Search ............... 705/67, 705/49, 1, 35, 36, 61, 64; 455/558
See application file for complete search history.

(56) References Cited

U.S. PATENT DOCUMENTS 5,953,423 A * 9/1999 Rosen ........................ 705/65
5,991,410 A * 11/1999 Albert et al. ................ 705/78
6,098,879 A * 8/2000 Terranova .................. 235/384
6,442,532 B1 * 8/2002 Kawan ....................... 705/35

FOREIGN PATENT DOCUMENTS

| DE | 44 25 271 A1 | 1/1996 |
| DE | 195 26 726 C2 | 1/1997 |
| DE | 196 28 045 A1 | 1/1998 |
| EP | 0 708 547 A2 | 4/1996 |
| EP | 0 848 360 A1 | 6/1998 |
| JP | 1041767 A2 * | 10/2000 |
| WO | WO 98/11519 | 3/1998 |
| WO | WP 08/28900 | 7/1998 |
| WO | WO 98/34203 | 8/1998 |
| WO | WO 98/37524 | 8/1998 |

OTHER PUBLICATIONS

MeT White paper on Mobile Transactions. Jan. 2003.*

* cited by examiner

*Primary Examiner*—Andrew J. Fischer
*Assistant Examiner*—John Winter
(74) *Attorney, Agent, or Firm*—Bell, Boyd & Lloyd LLP

(57) ABSTRACT

A method and system for paying for goods or services which includes a mobile radio device and a base telecommunication station which communicates with the mobile radio device via electromagnetic waves. The base telecommunication station transmits the data required for payment to the mobile radio device. The latter asks the user for confirmation for the payment. After the confirmation, the mobile radio device performs a payment operation by transmitting payment instruction data. In addition, either the mobile radio device or a telecommunication device of a financial institution transmits acknowledgment data for the payment operation to the base telecommunication station.

18 Claims, 2 Drawing Sheets

METHOD AND SYSTEM FOR PAYING FOR GOODS OR SERVICES

BACKGROUND OF THE INVENTION

1. Field of the Invention

The present invention relates to a method for securely paying for goods or services using a mobile radio device and a base telecommunication station which communicates with the mobile radio device via electromagnetic waves. The present invention also relates to a system for paying for goods or services.

2. Description of the Prior Art

Conventionally, goods in a shop, for example, are paid for either in cash, with a check or electronically using a credit card or a card issued by a financial institution specifically for this purpose. A disadvantage of such methods of payment is that the purchaser must carry either cash or specific cards.

There is also the option of using so-called telephone banking methods to make transfers by telephone. To do this, the user dials up his financial institution's telecommunication device, for example. Next, the person wishing to make the transfer is authenticated for security reasons. If the user turns out to be authorized to make the appropriate transfers, the user transmits the data required for the transfer. The data can be communicated to another person associated with the financial institution by speaking to him, for example. It is also possible for the user's telephone to transmit to the financial institution's telecommunication device short messages containing all the data required for the transfer. The financial institution can then make the transfer on the basis of these short messages.

To transmit personal information or access authorization information securely, the appropriate data is encrypted before transmission. Encryption, often called scrambling, is understood as the conversion of data into an unreadable form. Both encryption and decryption virtually always require some secret information, which is usually referred to as a key.

In a symmetrical encryption method, the same key is used both for scrambling and for unscrambling. The DES (Data Encryption Standard) is part of the symmetrical encryption method. In this method, transformation of the original text into the scrambled text includes a succession of mathematical operations such as permutations, nonlinear substitutions and logical product formations. In this context, a key which is individual to the user is used.

Asymmetrical encryption methods constitute the opposite of the symmetrical methods. In this case, different keys are used for scrambling and unscrambling, the nature of the keys being such that data which has been scrambled using one key can be unscrambled again only using the other key.

Telephone banking methods also can be carried out using mobile radio devices, such as mobile telephones. Mobile telephones based on the GSM standard include, firstly, the actual telephone with input and display devices and, secondly, a so-called SIM card having a personal identification number (PIN) stored in encrypted form. However, it is also possible to have the SIM card carry out additional applications which need to satisfy high levels of security requirements. (SIM Application Tool Kit, GSM 11.14). The data required for a transfer can be entered using the input device on the mobile telephone. The mobile telephone's SIM card can then be used for authentication required specifically for the transfer. Access to these offered items is made possible by novel technology. For this purpose, the user requires a mobile radio telephone with an integrated SIM Toolkit and a SIM card which supports the new added-value functions. To get to the virtual bank counter, the customer switches on his mobile telephone, enters the PIN number and selects his financial institution from the menu. Once the mobile radio telephone has dialed up the bank's server, the user can access his bank account within a few seconds.

In addition, so-called CTS (Cellular Telephony System) applications are known. Such systems include a base station and a mobile telephone for domestic use. The base station receives the associated mobile telephone's calls internally free of charge and forwards them to the landline network.

An object of the present invention, therefore, is to provide a method and a system for securely paying for goods or services which is simple, secure and inexpensive for the purchaser and the vendor.

SUMMARY OF THE INVENTION

Accordingly, a method for paying for goods or services using a mobile radio device and a base telecommunications device, which communicates with the mobile radio device via electromagnetic waves is provided by the present invention wherein the base telecommunication station transmits data required for payment to the mobile radio device, the mobile radio device asks the user for confirmation for the payment, after the confirmation, the mobile radio device performs a payment operation by transmitting payment instruction data, and the mobile radio device or the telecommunication device of a financial institution or bill issuer transmits acknowledgement data for the radio payment operation to the base telecommunication station.

An advantage of the method according to the present invention is that it is particularly simple, since the data required for payment is automatically transmitted to a purchaser's mobile radio device, so that the vendor does not need to inform the purchaser of this data. In addition, the method satisfies the same security requirements as telephone banking methods using mobile telephones. The security standards developed in this context can be adopted directly, which will contribute to a high level of acceptance for the method of the present invention. Since, in addition, the mobile radio device or the telecommunication device of a financial institution of the purchaser transmits acknowledgement data for the radio payment operation to the vendor's base telecommunication station, it is no longer absolutely essential for a vendor to be present in person, which is why the method of the present invention affords considerable opportunities for reducing costs and is also suitable for vending machines.

Within the scope of the present invention, information of data also can be transmitted in the form of short messages, messages, or using one or more data packets. The mobile radio device and the base telecommunication station also can communicate on the basis of a mobile radio standard, such as the GSM standard, a cordless standard, the Bluetooth standard, an infrared standard, such as the IrDA standard, or a future standard based on a CDMA method.

In an embodiment of the method according to the present invention, when performing the payment operation, the mobile radio device can communicate directly with a telecommunication device of a financial institution or of a bill issuer, for example on the basis of a mobile radio standard, such as the GSM standard. On the other hand, when performing the payment operation, the mobile radio device can transmit the payment instruction data to the base telecommunication station, which then transmits this data to a telecommunication device of the financial institution or of the bill issuer via a landline network connection or on the basis of a mobile radio standard, such as the GSM standard. In addition, the mobile radio device and the base telecommunication station can communicate using infrared radiation.

An advantage of the latter option is that it is particularly inexpensive, since only the low-priced charges of the landline network accrue. Even with the first option of direct communication between the mobile radio device and the telecommunication device of the financial institution, the telephone charges are also generally lower than credit card commissions, for example, which means that the method according to the present invention is particularly inexpensive both for the purchaser and for the vendor in this case.

If the data required for payment is not in the format which is required for the radio payment operation, the data received from the base telecommunication station can be converted by the mobile radio device into a format which is suitable for a radio payment operation before transmission.

Advantageously, the user of the mobile radio device is authenticated before the step of performing the payment operation. This authentication can be performed via the entry of a personal identification number or via biometric features. This measure ensures that the user of the mobile radio device is actually authorized to initiate the payment operation. In this context, the use of a personal identification number or the use of biometric features satisfy very high levels of security requirements.

In addition, in one advantageous refinement of the method according to the present invention, an electronic cash register can transmit the data required for payment to the base telecommunication station. This further simplifies and automates the payment operation, which makes the method according to the present invention even simpler and more inexpensive.

The data required for payment can include, by way of example, the sum of money which is to be paid and/or the account number and/or bank sort code of the recipient and/or of the purpose of use, such as the bill number.

The inventive system for paying for goods or services includes a base telecommunication station having a radio device for transmitting data required for payment to a mobile radio device and for receiving data from the mobile radio device, the mobile radio device having a reception device for receiving the data transmitted by the base telecommunication station, an interrogation device, connected to the reception device, for requesting confirmation for the payment, and a transmission device, connected to the interrogation device, for transmitting data for a payment operation and for transmitting acknowledgement data for the radio payment operation to the base telecommunication station.

Additional features and advantages of the present invention are described in, and will be apparent from, the following detailed description of the preferred embodiments and the drawings.

DETAILED DESCRIPTION OF THE PREFERRED EMBODIMENTS

Figure 1:
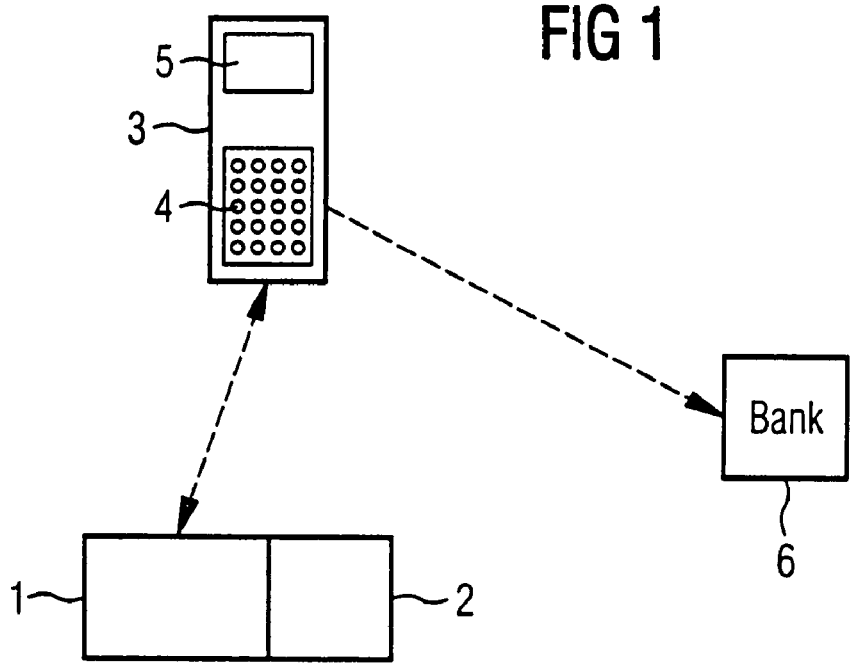
FIG. 1 shows a first illustrative embodiment of the present invention.

The text below explains illustrative embodiments of the inventive system for paying for goods or services. In this illustrative embodiment, the inventive system is intended to be installed in the shop of a vendor, the purchaser paying for goods using a mobile radio device in the inventive system.

In variant embodiments of the present invention, data required for payment and/or payment instruction data and/or acknowledgement data are provided with a key (the key is appended to the appropriate data, for example) and/or are encrypted using a key. Depending on the variant embodiment, the key is used to verify and/or to decrypt the data which have been encrypted using it.

Installed in the shop of the vendor is a base telecommunication station 1. This base telecommunication station 1 is advantageously connected to an electronic cash register 2, so that the data recorded by the cash register 2 is transmitted directly to the base telecommunication station 1. The base telecommunication station 1 is equivalent to the base station in a CTS (Cordless Telephony System) with a data transmission capability. It can communicate with a mobile radio device 3 via electromagnetic waves. In the illustrative embodiment described in this case, it is assumed that the mobile radio device 3 is a mobile telephone based on the GSM standard. The mobile radio device 3 also could be another electronic device, however, such as a schedule planner equipped for radio transmission of data. However, the use of a mobile telephone based on the GSM standard has the advantage that no or only very few modifications need to be made to the appliance.

For the payment operation, the vendor's base telecommunication station 1 transmits to the purchaser's mobile telephone 3 the data required for a payment operation and a key for any encryption of data to be transmitted which may be performed. This data include, by way of example, the value of the sum of money as transmitted by the electronic cash register 2, the telephone number of the base telecommunication station or the account number and bank sort code of the vendor. This data is received by the mobile telephone 3 and is displayed using the display 5 on the mobile telephone 3. The mobile telephone 3 then requests confirmation that the indicated sum of money is to be transferred from the account of the owner of the mobile telephone 3 to the relevant account indicated. The confirmation can be given by the user using the input unit 4 on the mobile telephone 3.

Advantageously, the user is then authenticated. By way of example, the mobile telephone 3 can request a specific personal identification number required only for transfers, or biometric features of the user can be detected, which allows the user to be identified in a particularly reliable and simple manner. If the user turns out to be authorized, the data required for the payment operation, or some of this data, is possibly encrypted using the key transmitted together with these data by the base telecommunication station, and these payment instruction data is transmitted by the mobile telephone 3 to a telecommunication device 6 of a financial institution or bill issuer, and the appropriate sum is debited or billed. In this context, the payment instruction data can also contain all or some of the data required for payment and the telephone number of the mobile radio device. It is also possible for the key just to be transmitted together with the payment instruction data, but not to be used for encryption thereof or for encrypting other data.

The mobile telephone 3 then transmits acknowledgement data to the base telecommunication station 1 of the vendor, so that the latter receives notice of payment for his goods. In addition, the telecommunication device 6 of the financial institution or bill issuer could also transmit the acknowledgement data to the base telecommunication station 1. The acknowledgement data provided with or encrypted using the same key is possibly decrypted in the base telecommunication station 1 or in an associated unit and, after successful decryption, is transmitted to the cash register which, after successful verification of the key, issues the receipt and records the sum as having been paid. In this case, the acknowledgement data may also contain some of the data required for payment, or data which describes the type of goods or which describes the price of the goods, and receipt or processing thereof initiates issue of the goods or provision of the service.

This possible further encryption of the data using a key which is transmitted to the mobile radio device by the base telecommunication station allows the data to be protected from unauthorized access even when transmitted beyond the mobile radio system; for example, via the landline network to the server of a bank or bill issuer.

Figure 2:
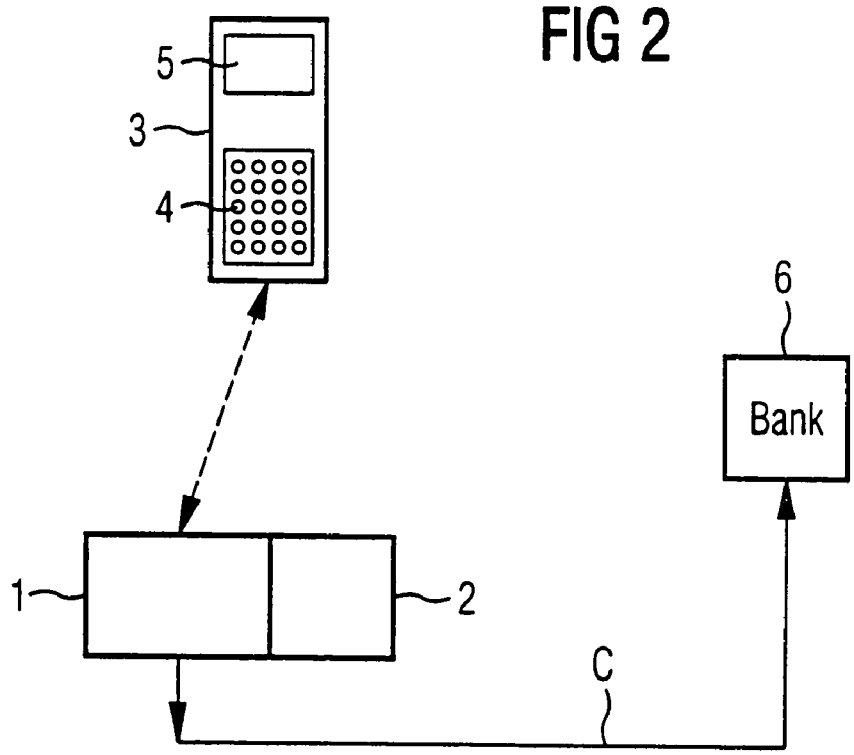
FIG. 2 shows a second illustrative embodiment of the present invention.

FIG. 2 shows another illustrative embodiment of the present invention. The illustrative embodiment shown in FIG. 2 differs from the illustrative embodiment shown in FIG. 1 only in that, when performing the payment operation, the mobile telephone 3 does not transmit the encrypted payment instruction data directly to the telecommunication device of the financial institute, but instead transmits this data back to the base telecommunication station 1. The base telecommunication station 1 then transmits the data to the telecommunication device 6 of the financial institution or a bill issuer via a landline network connection C or via a mobile radio connection.

In this case, however, the transmission method used to transmit the data to the base telecommunication device 1 can differ from that used to transmit the data to the financial institution in the first illustrative embodiment.

As such, in this case, the vendor makes his base telecommunication station 1 available to the purchaser for transmission of a short message. In this way, the payment operation takes a particularly inexpensive form, since no costs at all arise for the purchaser, and the vendor need merely find the relatively low charges of the landline network for a short message.

In this case, the acknowledgement data for the payment operation can be transmitted to the base telecommunication station from the mobile radio device together with the payment instruction data. In addition, it is also possible for the payment instruction data to be interpreted as acknowledgement data, so that there is no need for transmission of separate acknowledgement data. Furthermore, the acknowledgement data could be transmitted to the base telecommunication station 1 by the financial institution.

Figure 3:
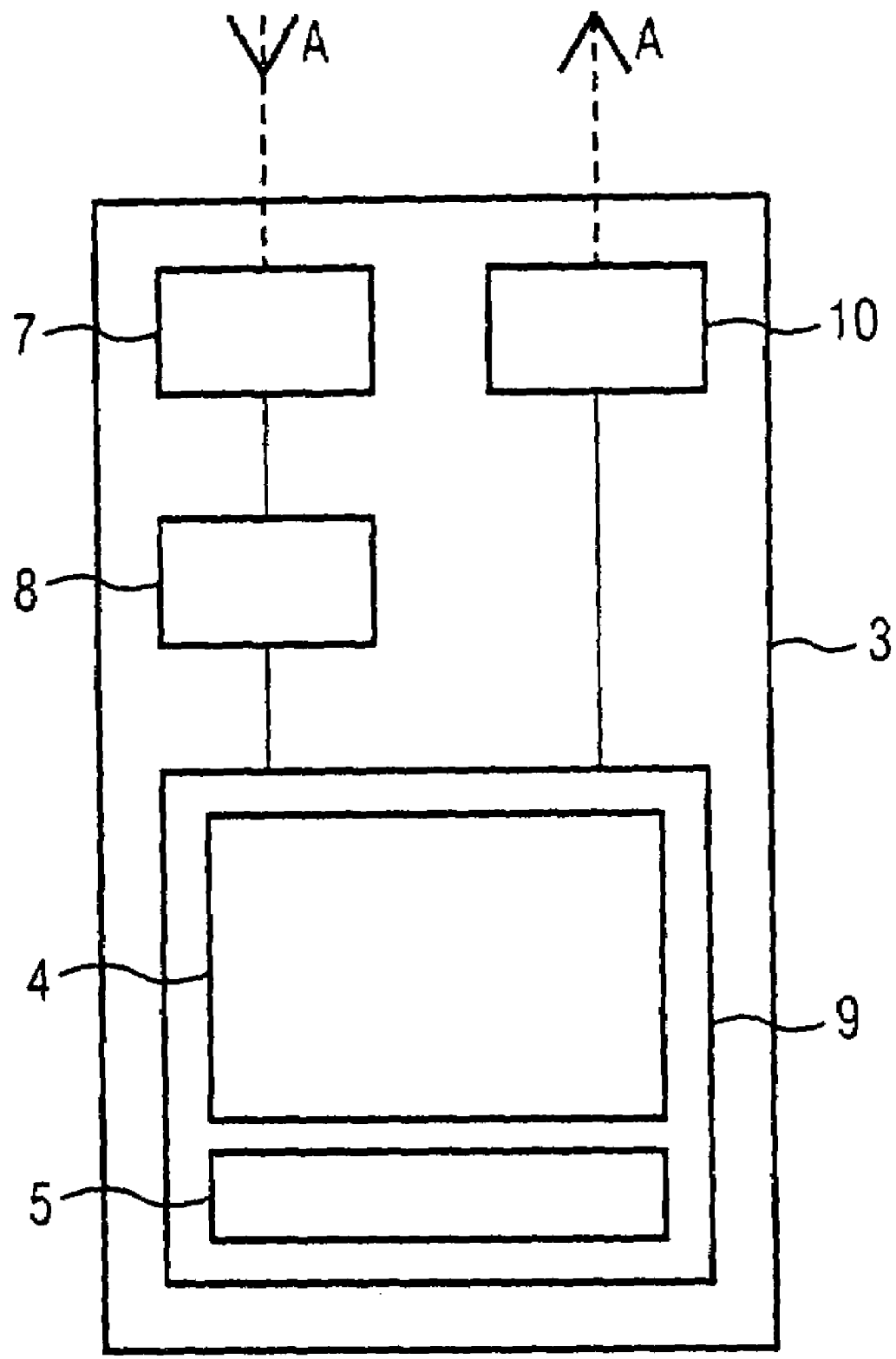
FIG. 3 is a schematic illustration of the design of the mobile radio device.

FIG. 3 shows possible embodiments of the mobile radio device 3 in the illustrative embodiments explained above. The mobile radio device 3 has a reception device 7 which receives the data required for payment which has been transmitted by the base telecommunication station 1. If this data is in a format which can be used to perform a payment operation directly, further processing of the data is not necessary. In this case, which is not shown in FIG. 3, the data is transferred to an interrogation device 9 which requests confirmation for the payment via the display 5 and the input device 4. If appropriate, this interrogation device 9 also may be used to authenticate the user, as explained above. If the payment has been confirmed and if the authentication has established that the user is authorized to make the payment for which confirmation has been requested, the data is transferred to the transmission device 10, which transmits the data for the payment operation. Before transmission, the data is possibly encrypted using a digital signal processor.

In the first illustrative embodiment of the present invention, the data are then transmitted directly to a telecommunication device 6 of a financial institution or bill issuer, whereas in the second illustrative embodiment, shown in FIG. 2, the data is transmitted back to the base telecommunication station 1. It is also possible for the transmission device 10 to transmit acknowledgement data for the payment operation to the base telecommunication station 1.

In case the data received from the base telecommunication station 1 is in a different format than the format required for the payment operation, the mobile radio device 3 is provided with a conversion device 8 which converts the data received into a format which is suitable for a payment operation. By way of example, this conversion device may be provided between the reception device 7 and the interrogation device 9, as shown in FIG. 3. However, the conversion device 8 also may be provided between the interrogation device 9 and the transmission device 10.

With regard to the first illustrative embodiment, in which the mobile radio device 3 communicates both with the base telecommunication station 1 and with the telecommunication device 6 of a financial institution or bill issuer, the mobile radio device 3 also may have separate transmission and reception devices 7, 10 for communication with the base telecommunication device 1 and the telecommunication device 6 of the financial institution. As such, by way of example, communication with the base communication device 1 could take place via infrared radiation, and communication with the telecommunication device 6 of the financial institution could take place on the basis of the GSM standard.

In another application, the present invention is used for withdrawing money from a cash machine. In this case, the base telecommunication device 1 is a financial institution's cash machine, which is connected to the financial institution's central computer via a landline network line. To withdraw money, a person enters an appropriate request on the cash machine. The cash machine sends this data together with a key to the mobile radio device 3, which asks the person for confirmation for the withdrawal operation. The person is then advantageously authenticated via the mobile radio device 3. If the person has been identified as being authorized and has entered confirmation for the withdrawal operation into the mobile radio device, the mobile radio device transmits data provided with or encrypted using the key to the cash machine, so that the latter is informed that the money can be paid out. For debiting the sum of money, the cash machine communicates with the financial institution's central computer via a landline network connection.

In one particularly simple embodiment of the present invention, the base telecommunication station includes an infrared interface based on the IrDA standard and a GSM module. The infrared interface and the GSM module are connected to the control system usually provided in a vending machine or a cash register. In this context, the data also can be transmitted via an AT cellular interface based on an infrared interface.

Infrared beams are then used to transmit to the mobile telephone a short message containing, in plain text, the question regarding whether the customer wants to pay for the requested goods at the requested price, and possibly a key number. The short message contains data required for payment, optionally a key and the telephone number of a "sender". Since the short message is generated synthetically by a control system, this telephone number can be permanently programmed in the vending machine or in the cash register and then corresponds to the telephone number of the bill issuer. The customer reads the short message and, if he is in agreement, generates a "YES" response. On many mobile telephones, this is possible with few keystrokes or can be simplified via an SIM Application Toolkit. The short message generated by the customer is then sent to the "sender" telephone number; that is, to the bill issuer. The bill issuer's service computer puts the sum onto the bill of the customer, who is, in turn, identified by his telephone number contained in his short message. The bill issuer's service computer then transmits a message for issuing the requested goods to the vending machine or to the cash register. This message can be transmitted via GSM or else via a landline network of whatever type or via any desired network based on electromagnetic waves. The (optionally) transmitted key is checked in the cash register or in the vending machine, where it was also generated, of course, and the requested goods are issued.

The key is checked or verified by comparing the transmitted key with a key stored in the base telecommunication station or in an associated unit after generation of the key. After successful comparison, that is to say if the two keys match, the goods paid for are issued or the service paid for is provided.

The text below explains another specific illustrative embodiment of the present invention:

A customer stands before a vending machine and presses a button for goods which he wants, or the customer stands at a cash register.

The cash register or the vending machine uses infrared beams (for example IrDA) to send a message, short message or appropriate data packets to the customer's mobile telephone on the basis of the Bluetooth standard, a cordless standard or a mobile radio standard. Besides all the data required for payment, this message contains a key which can be used on one or more subsequent signal paths to encrypt the appropriate data. In addition, the message contains the telephone number of the bill issuer (billing center). This also may be a bank, a network operator or a department store chain.

The message initiates a SIM Application Toolkit application on the mobile radio telephone, and this application starts a dialogue with the customer. The customer is asked: "Do you want to buy a cola at this vending machine for 1.50 euros?" or "Do you want to pay DM 123.45 in the groceries department of Hertie?".

The softkey "yes" or a specified number button is used, possibly after a PIN has been requested, to generate a message which contains the price, the type of goods, the number of the vending machine or of the cash register and possibly that of the customer. This data is encrypted using the key and is sent to the billing center. The requesting of a PIN, e.g. upward of a particular sum, can be activated by the customer.

In the billing center, the sum is put onto the customer's bill, and a message encrypted using the same key is transmitted to the vending machine which, after successful decryption, issues the requested goods, or is transmitted to the cash register, which issues the receipt and records the sum as having been paid.

In this case, the billing center (the bill issuer) is not limited to a financial institution. It also may be the network operator, the operator of the vending machines or of the cash registers, or a credit card company. The acknowledgement data for the payment operation does not have to be forwarded via a mobile radio system, such as the GSM system. The billing center can be situated, by way of example, in a large department store networked to the cash registers.

As the key, a randomly generated number can be sent back to the bill issuer, and from there to the vending machine, with the payment instruction. Since the vending machine has generated the key, it is itself able to check it. In this context, additional security also can be generated by encrypting the entire message in a way which is known to the vending machine and to the bill issuer. In this case, no encryption need take place in the mobile telephone.

In one variant embodiment of the present invention, the key is generated by the cash register/the vending machine or by the base telecommunication station as a random number, since the key is again checked at the cash register/the vending machine. The key can additionally be changed in the billing center on the basis of an algorithm which is known in the cash register/the vending machine or in the base telecommunication station. If, in addition, the connection between the cash registers and the billing center is used to change the algorithm on a regular basis, misuse of the payment operation is prevented.

Although the present invention has been described with reference to specific embodiments, those of skill in the art will recognize that changes may be made thereto without departing from the spirit and scope of the invention as set forth in the hereafter appended claims.

We claim:

1. A system for securely paying for goods and services, comprising:
   a base telecommunication station having a radio device for transmitting data required for payment to a mobile radio device and for receiving data from the mobile radio device; and
   the mobile radio device which includes:
      a reception device for receiving the data transmitted by the base telecommunication station;
      an interrogation device connected to the reception device for requesting confirmation for the payment;
      a transmission device connected to the interrogation device for transmitting data for at least one of initiating a payment operation and transmitting acknowledgement data for the payment operation to the base telecommunication station;
      a conversion device, connected to the reception device, for converting the data received into a format which is suitable for a payment operation; and
      a conversion unit which converts data which has been transmitted by the base telecommunication station and is required for payment into a readable short message such that a sender telephone number entered is the telephone number of a telecommunication device of one of a financial institution and a bill issuer which has been transmitted with the data required for payment.

2. A system for securely paying for goods and services as claimed in claim 1, the system further comprising:
   an electronic cash register connected to the base telecommunication station, the electronic cash register designed to transmit the data required for payment to the base telecommunication station.

3. A system for securely paying for goods and services as claimed in claim 1, further comprising:

a computing device, associated with the base telecommunication station, for at least one of producing and verifying a key.

4. A system for securely paying for goods and services as claimed in claim 1, wherein the data required for payment includes at least one of a sum of money which is to be paid, a name for the goods which are to be paid for, a name for the services which are to be paid for, a recipients account number, a bank sort code, a purpose of use, a customer number, and a telephone number of a telecommunication device of one of a financial institution and a bill issuer.

5. A method for securely paying for goods and services, comprising:

communicating data required for payment between a mobile radio device and a base telecommunication station comprising a radio device;

receiving the data transmitted by the base telecommunication station in a reception device of the mobile radio device;

requesting confirmation for the payment via an interrogation device connected to the reception device;

transmitting data for at least one of initiating a payment operation and transmitting acknowledgement data for the payment operation to the base telecommunication station via a transmission device in the mobile radio device connected to the interrogation device;

converting the data received into a format which is suitable for a payment operation via a conversion device, connected to the reception device; and converting data which has been transmitted by the base telecommunication station and is required for payment into a readable short message via a conversion unit, such that a sender telephone number entered is the telephone number of a telecommunication device of one of a financial institution and a bill issuer which has been transmitted with the data required for payment.

6. A method for paying for goods and services as claimed in claim 5, wherein the step of initiating a payment of operation includes the mobile radio device communicating directly with a telecommunication device of a financial institution.

7. A method for paying for goods and services as claimed in claim 5, wherein the step of initiating a payment operation includes the mobile radio device transmitting the payment instruction data to the base telecommunication station, and the base telecommunication station transmitting the payment instruction data to a telecommunication device of a financial institution via a landline network connection.

8. A method for paying for goods and services as claimed in claim 5, the method further comprising the step of:

converting, via the mobile radio device, the data received from the base telecommunication station into a format which is suitable for a payment operation before transmission.

9. A method for paying for goods and services as claimed in claim 5, the method further comprising the step of:

authenticating the user of the mobile radio device before the step of initiating the payment operation.

10. A method for paying for goods and services as claimed in claim 9, wherein the user is authenticated via at least one of a personal identification number entry and biometric features.

11. A method for paying for goods and services as claimed in claim 5, wherein an electronic cash register transmits the data required for payment to the base telecommunication station.

12. A method for paying for goods and services as claimed in claim 5, the method further comprising the steps of:

transmitting, via the base telecommunication station, a key generated in one of the base telecommunication station and an associated unit to the mobile radio device;

transmitting the key, via the mobile radio device, to the telecommunication device of one of a financial institution and a bill issuer; and transmitting the key to the base telecommunication station by the telecommunication device of one of the financial institution and the bill issuer.

13. A method for paying for goods and services as claimed in claim 12, wherein the key is used at least on particular transmission paths to encrypt data which is to be transmitted.

14. A method for paying for goods and services as claimed in claim 5, the method further comprising the step of:

automatically transmitting a short message containing data required for payment to the telecommunication device of one of the financial institution and the bill issuer after the short message has been read and after appropriate confirmation by the user.

15. A method for paying for goods and services as claimed in claim 5, wherein the mobile radio device and the telecommunication device of one of a financial institution and a bill issuer communicate on the basis of a mobile radio standard.

16. A method for paying for goods and services as claimed in claim 12, the method further comprising the steps of:

comparing the transmitted key with a key stored in one of the base telecommunication station and an associated unit; and providing at least one of goods and services upon a successful comparison between the transmitted key and the key stored.

17. A method for paying for goods and services as claimed in claim 12, wherein the key is transmitted together with at least one of data required for the payment operation and acknowledgement data for the payment operation.

18. A method for paying for goods and services as claimed in claim 5, wherein the data required for payment includes at least one of a sum of money which is to be paid, a name for the goods to be paid for, a name for the service to be paid for, a recipients account number, a bank sort code, a purpose of use, a customer.

* * * * *